(12) United States Patent
McFarland et al.

(10) Patent No.: US 7,104,338 B1
(45) Date of Patent: Sep. 12, 2006

(54) SWEEPER CHAIN SUPPORT SYSTEM

(76) Inventors: David L. McFarland, 8191 130th Ave. S.E., Gwinner, ND (US) 58040; Clayton A. Melrose, 405 S. 11th St., Oakes, ND (US) 58474

( * ) Notice: Subject to any disclaimer, the term of this patent is extended or adjusted under 35 U.S.C. 154(b) by 0 days.

(21) Appl. No.: 11/194,069

(22) Filed: Jul. 29, 2005

(51) Int. Cl.
*A01D 17/00* (2006.01)

(52) U.S. Cl. ........................ 171/130; 171/125
(58) Field of Classification Search .............. 171/124, 171/130, 138, 144; 37/190, 463, 464, 465
See application file for complete search history.

(56) References Cited

U.S. PATENT DOCUMENTS

| 1,578,600 | A |   | 3/1926  | Greatrix |              |
|-----------|---|---|---------|----------|--------------|
| 2,093,148 | A | * | 9/1937  | Hoofnagle et al. | 171/89 |
| 2,419,154 | A | * | 4/1947  | O'Brien  | 171/98       |
| 2,693,746 | A | * | 11/1954 | Klein    | 171/126      |
| 3,621,919 | A | * | 11/1971 | Olson    | 171/120      |
| 4,014,390 | A | * | 3/1977  | Teixeira | 171/124      |
| 4,050,518 | A | * | 9/1977  | Gilmour  | 171/116      |
| 4,382,471 | A | * | 5/1983  | Peterson | 171/124      |
| 4,603,544 | A | * | 8/1986  | Hayhurst | 56/328.1     |
| 5,083,978 | A | * | 1/1992  | Royneberg | 460/149     |
| 6,094,847 | A |   | 8/2000  | Gallenberg | 37/422     |
| 6,540,030 | B1 |  | 4/2003  | Ohzeki et al. | 171/1    |
| 6,634,434 | B1 |  | 10/2003 | Ohzeki et al. | 171/63   |
| 6,640,906 | B1 |  | 11/2003 | Ohzeki et al. | 171/65   |
| 6,805,204 | B1 |  | 10/2004 | Bauer et al. | 171/111   |

FOREIGN PATENT DOCUMENTS

GB          0277739 A1 *  1/1988

* cited by examiner

*Primary Examiner*—Daniel P. Stodola
*Assistant Examiner*—Nahid Amiri
(74) *Attorney, Agent, or Firm*—Michael S. Neustel (57) ABSTRACT

A sweeper chain support system for allowing efficient removal of debris between a sweeper chain and a digger chain. The sweeper chain support system includes a rear roller supporting a rear portion of a sweeper chain, a pair of rear arms attached to the rear roller in a pivoting manner, a front roller supporting a front portion of the sweeper chain, a pair of front arms attached to the front roller in a pivoting manner, and a link member connected between the front arms and the rear arms. When the front arms are lifted, the rear arms are simultaneously lifted causing the front roller and the rear roller to lift upwardly thereby removing the weight of the lower run of the sweeper chain to allow for the removal of lodge debris (e.g. rock).

20 Claims, 7 Drawing Sheets

SWEEPER CHAIN SUPPORT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to sweeper chains for land surface cleaning equipment and more specifically it relates to a sweeper chain support system for allowing efficient removal of debris between a sweeper chain and a digger chain.

2. Description of the Related Art

Any discussion of the prior art throughout the specification should in no way be considered as an admission that such prior art is widely known or forms part of common general knowledge in the field.

Ground surface cleaning machines have been in use for years for cleaning debris (e.g. rocks, sticks, bottles, cans, paper, etc.) from various types of ground surfaces (e.g. sand, dirt). Such ground surface cleaning machines are typically self-powered and relatively expensive. However, there have been proposed ground surface cleaning machines that are attached to an existing tractor to receive their operational power. Examples of such ground surface cleaning machines are illustrated in U.S. Pat. No. 6,094,847 to Gallenberg (Beach Cleaning Apparatus and Method), U.S. Pat. No. 1,578,600 to Greatrix (Combined Stone and Root Gatherer), U.S. Pat. No. 6,805,204 to Bauer (Vehicle, Especially for Beach Cleaning), U.S. Pat. No. 6,540,030 to Ohzeki (Method for Recovering Waste in Sandy Beach), U.S. Pat. No. 6,640,906 to Ohzeki (Beach Cleaner) and U.S. Pat. No. 6,634,434 to Ohzeki (Beach Cleaner) which are all incorporated by reference into this application for the purpose of disclosing a ground surface cleaning machine.

Conventional ground surface cleaning machines have a frame typically having a pair of opposing side portions with a plurality of cross members extending between the side portions. Conventional ground surface cleaning machines further typically include one or more chains supported upon rollers that provide for the movement and cleaning of the ground surface. Control systems (e.g. hydraulic motors, valve blocks, electronics, etc.) are attached to the frame and are therefore susceptible to damage from moving debris (e.g. rocks) created via the cleaning action of the machine.

While conventional ground surface cleaning machines are suitable for the particular purpose to which they address, they are not as suitable for allowing efficient removal of debris between a sweeper chain and a digger chain. The main problem with conventional ground surface cleaning machines is that they do not allow for the convenient removal of debris from between a sweeper chain and a digger chain.

In these respects, the sweeper chain support system according to the present invention substantially departs from the conventional concepts and designs of the prior art, and in so doing provides an apparatus primarily developed for the purpose of allowing efficient removal of debris between a sweeper chain and a digger chain.

BRIEF SUMMARY OF THE INVENTION

In view of the foregoing disadvantages inherent in the known types of land surface cleaning equipment now present in the prior art, the present invention provides a new sweeper chain support system construction wherein the same can be utilized for allowing efficient removal of debris between a sweeper chain and a digger chain.

The general purpose of the present invention, which will be described subsequently in greater detail, is to provide a new sweeper chain support system that has many of the advantages of the land surface cleaning equipment mentioned heretofore and many novel features that result in a new sweeper chain support system which is not anticipated, rendered obvious, suggested, or even implied by any of the prior art land surface cleaning equipment, either alone or in any combination thereof.

To attain this, the present invention generally comprises a rear roller supporting a rear portion of a sweeper chain, a pair of rear arms attached to the rear roller in a pivoting manner, a front roller supporting a front portion of the sweeper chain, a pair of front arms attached to the front roller in a pivoting manner, and a link member connected between the front arms and the rear arms. When the front arms are lifted, the rear arms are simultaneously lifted causing the front roller and the rear roller to lift upwardly thereby removing the weight of the lower run of the sweeper chain to allow for the removal of lodge debris (e.g. rock).

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a sweeper chain support system that will overcome the shortcomings of the prior art devices.

A second object is to provide a sweeper chain support system for allowing efficient removal of debris between a sweeper chain and a digger chain.

Another object is to provide a sweeper chain support system that reduces the amount of time and physical effort required to remove debris trapped between a sweeper chain and a digger chain.

An additional object is to provide a sweeper chain support system that allows for larger pieces of debris to exit from between the sweeper chain and the digger chain.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 7 illustrate a sweeper chain support system 10, which comprises a rear roller 50 supporting a rear portion of a sweeper chain 40, a pair of rear arms 60 attached to the rear roller 50 in a pivoting manner, a front roller 52 supporting a front portion of the sweeper chain 40, a pair of front arms 70 attached to the front roller 52 in a pivoting manner, and a link member connected between the front arms 70 and the rear arms 60. When the front arms 70 are lifted, the rear arms 60 are simultaneously lifted causing the front roller 52 and the rear roller 50 to lift upwardly thereby removing the weight of the lower run of the sweeper chain 40 to allow for the removal of lodge debris 12 (e.g. rock).

B. Cleaning Machine

The cleaning machine 20 may be comprised of any machine capable of cleaning a ground surface. The cleaning machine 20 preferably includes a digger chain 30 and a sweeper chain 40 between the side frames 22 thereof as illustrated in FIGS. 2 through 5 of the drawings. The sweeper chain 40 assists in preventing debris 12 removed from the ground surface by the digger chain 30 from rolling forward on the digger chain 30 by compressing the debris 12 between the chains 30, 40. The cleaning machine 20 may be self-powered or connected to a tractor to provide the power to the cleaning machine 20.

U.S. Pat. No. 6,094,847 illustrates an exemplary cleaning machine 20 teaching the usage of a digger chain 30 and a sweeper chain 40. The applicant hereby incorporates by reference U.S. Pat. No. 6,094,847 into this application.

C. Rear Support for Sweeper Chain

Figure 1:
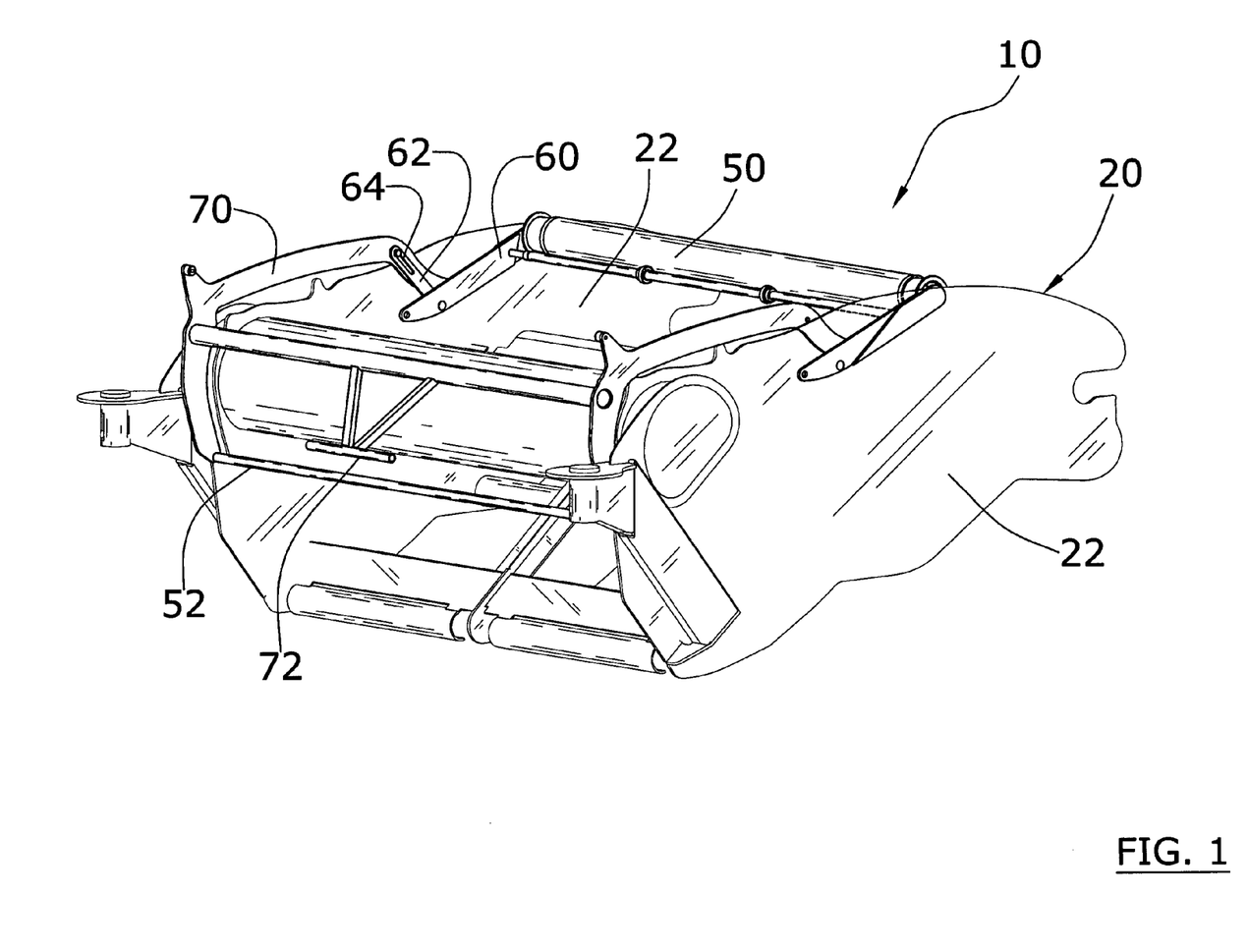
FIG. 1 is an upper perspective view of the present invention without the sweeper chain.
Figure 2:
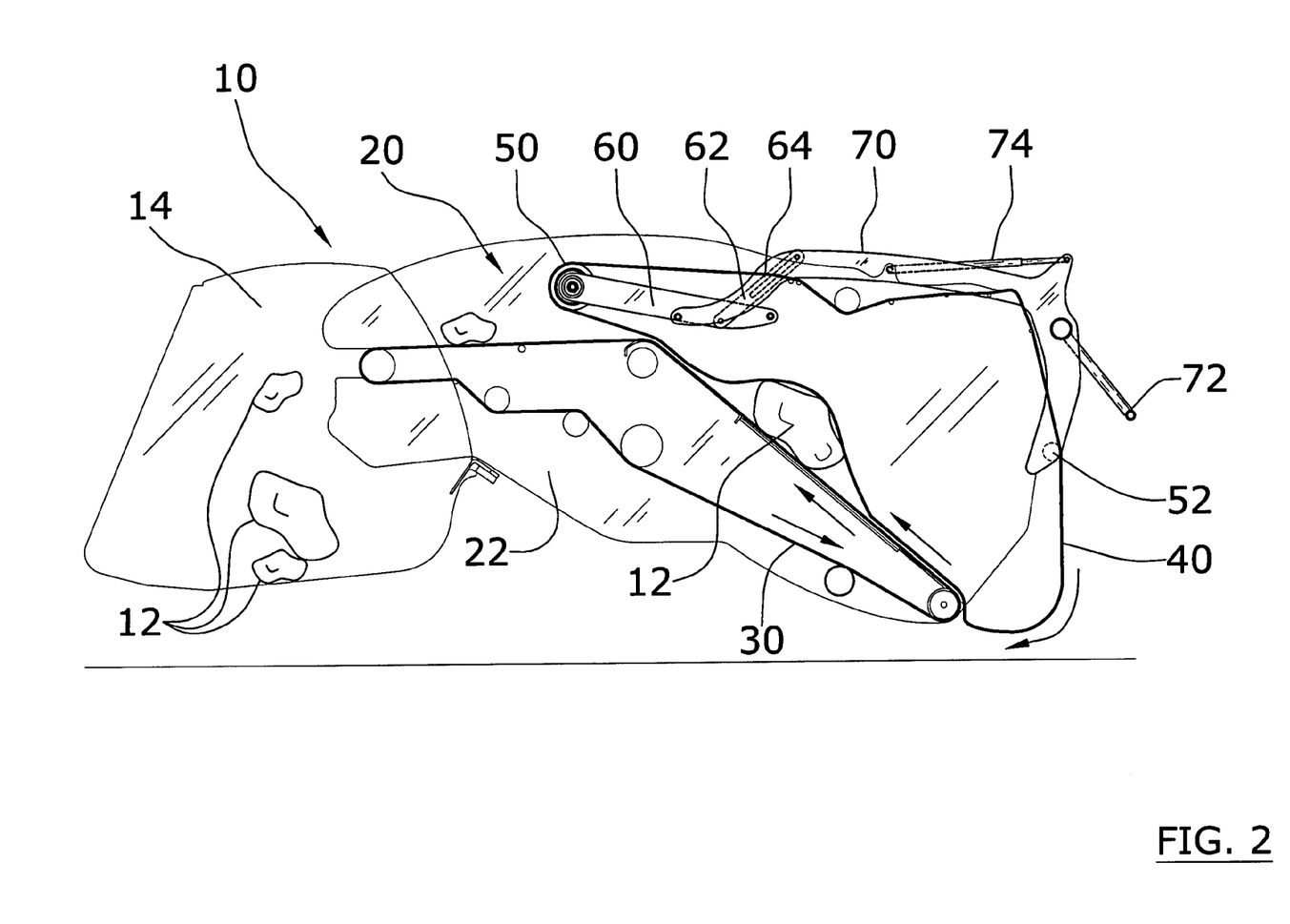
FIG. 2 is a side view of the present invention illustrating a rock positioned between the sweeper chain and the digger chain.
Figure 3:
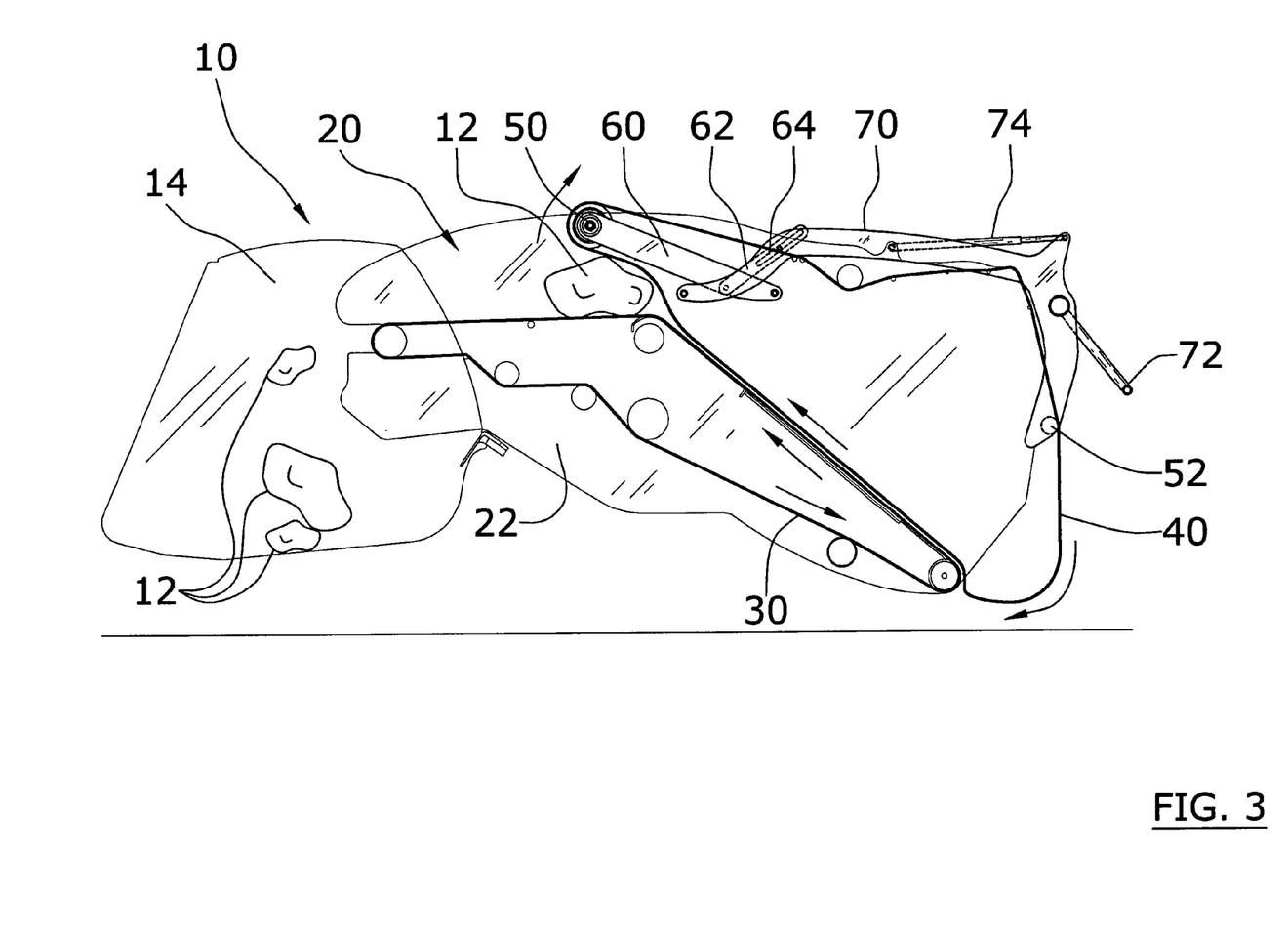
FIG. 3 is a side view of the present invention illustrating a rock exiting the sweeper chain by lifting the biased rear arms that support the rear roller.

FIGS. 1 through 5 illustrate a rear roller 50 supporting a rear portion of the sweeper chain 40. A pair of rear arms 60 are pivotally attached at a first pivot point to the cleaning machine 20 as best illustrated in FIGS. 1 through 4 of the drawings. The rear arms 60 are attached to and support the rear roller 50 opposite of the first pivot point as illustrated in FIGS. 2 through 5 of the drawings. The rear arms 60 extend substantially rearwardly as further shown in FIGS. 2 through 5 of the drawings. The rear roller 50 is allowed to move upwardly when a large piece of debris 12 is encountered (e.g. rock) thereby preventing jamming and preventing squeezing of the debris 12 from between the chains 30, 40 as best illustrated in FIG. 3 of the drawings. The rear roller 50 is preferably positioned rearwardly of a slanted portion of the digger chain 30 where the chains 30, 40 are near one another to reduce the squeezing of debris 12 between the rear roller 50 and an upper roller (not numbered) of the digger chain 30.

A bias member (not shown) may be attached between the cleaning machine 20 and the rear arms 60 for applying a downward bias force upon the rear arms 60. The bias member may be comprised of any device capable of applying a bias force upon the rear arms 60. However, a bias member is not required for the rear arms 60 to operate properly based upon the forces as applied by the sweeper chain 40.

D. Front Support for Sweeper Chain

FIGS. 1 through 5 illustrate a front roller 52 supporting a front portion of the sweeper chain 40. A pair of front arms 70 are pivotally attached at a second pivot point to the cleaning machine 20 as shown in FIGS. 2 through 5 of the drawings. The rear arms 60 are attached to and supporting the rear roller 50 as further shown in FIGS. 2 through 5 of the drawings. The second pivot point is preferably positioned rearwardly with respect to the first pivot point as best illustrated in FIGS. 2 through 5 of the drawings. A handle 72 is preferably attached between the front arms 70 for allowing a user to manually lift the front arms 70.

At least one actuator 74 is connected between the cleaning machine 20 and the front arms 70 for providing an upward lifting force when the front arms 70 are lifted manually by the user thereby reducing the effective weight the user has to lift. The actuator 74 is preferably substantially aligned with the front arms 70 when the front arms 70 are lowered thereby providing an insignificant amount of lifting force to the front arms 70 as shown in FIGS. 2 and 3 of the drawings. The actuator 74 is preferably at an angle with respect to the front arms 70 for assisting in lifting the front arms 70 when the front arms 70 are partially lifted. The at least one actuator 74 is preferably comprised of a pressurized gas actuator, however, the actuator 74 may also be comprised of various other biasing structures. It can be appreciated that a hydraulically powered actuator 74 may be connected to the front arms 70 for allowing non-manual lifting of the front arms 70.

E. Link Members

Figure 4:
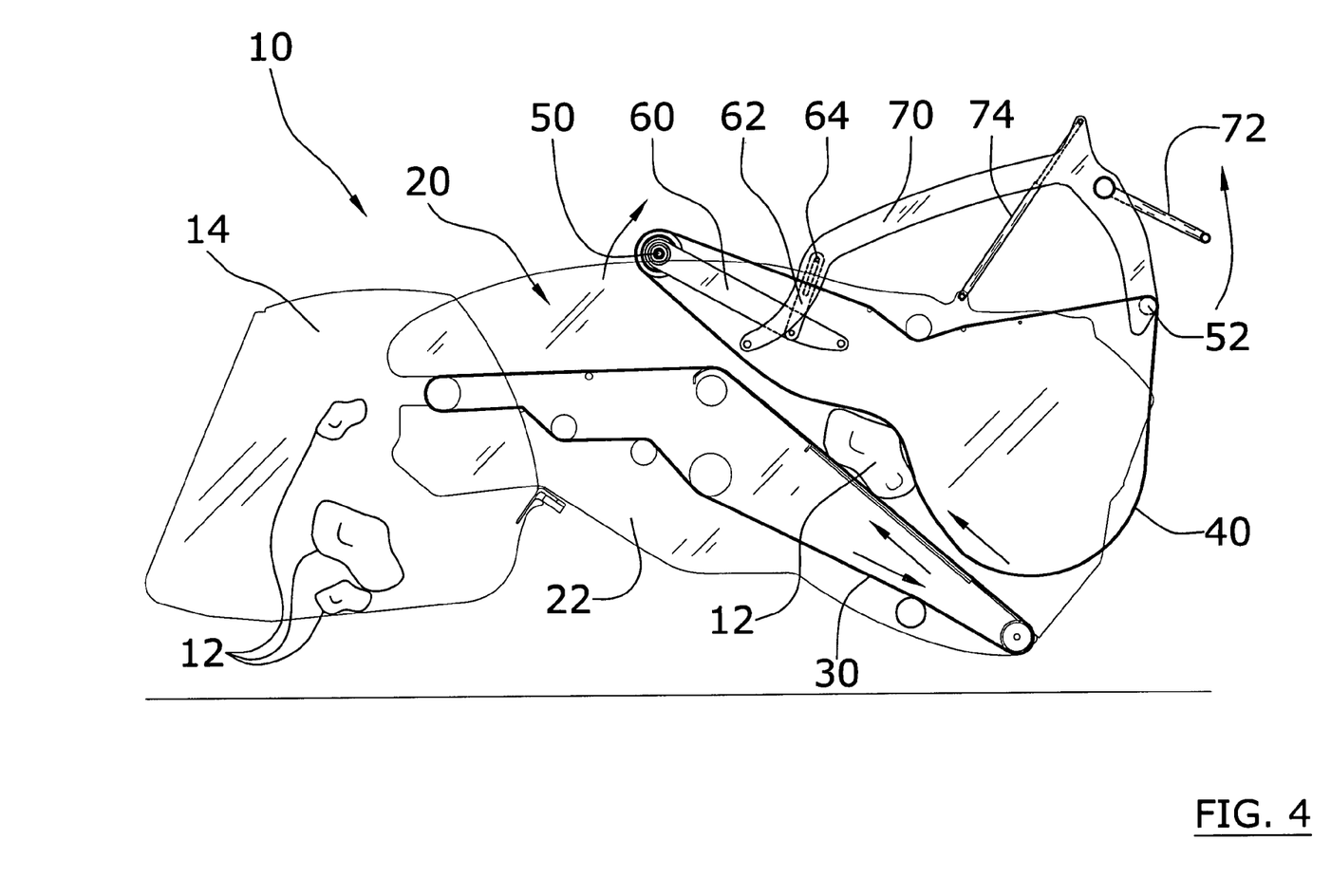
FIG. 4 is a side view of the present invention with the sweeper chain partially lifted.
Figure 5:
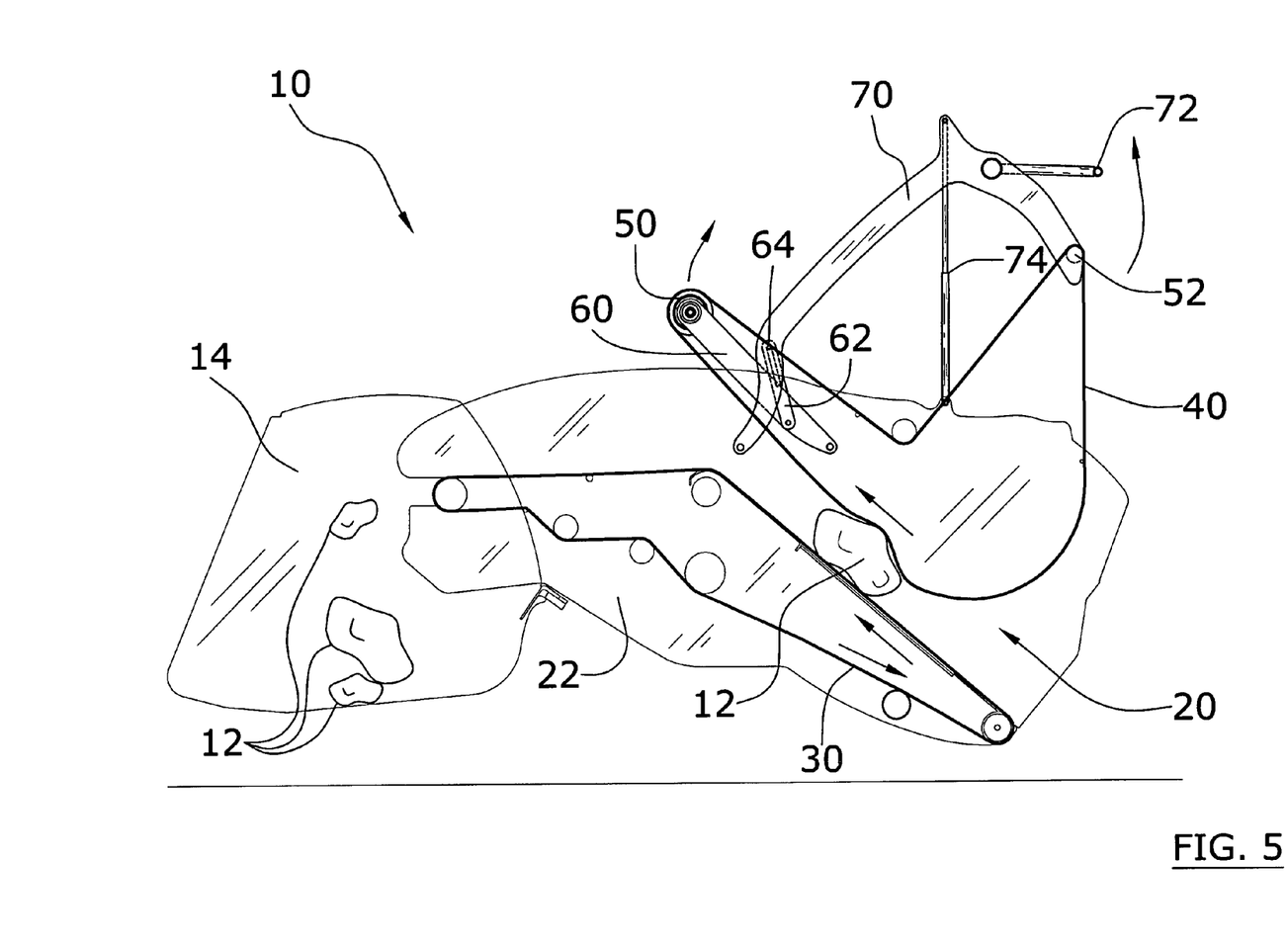
FIG. 5 is a side view of the present invention with the sweeper chain fully lifted to allow for easy removal of debris lodged between the sweeper chain and the digger chain.
Figure 6:
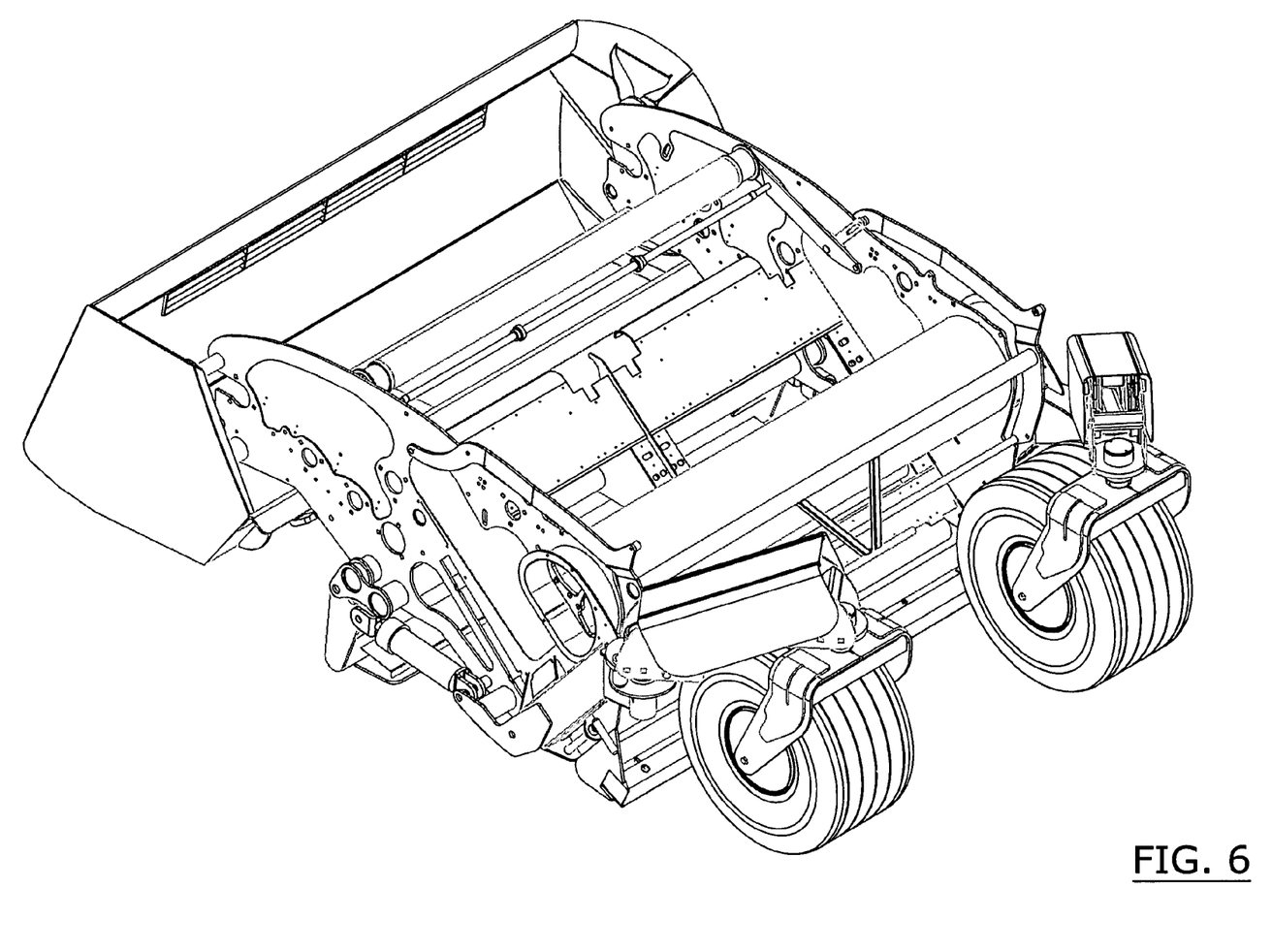
FIG. 6 is an upper perspective view of the present invention.
Figure 7:
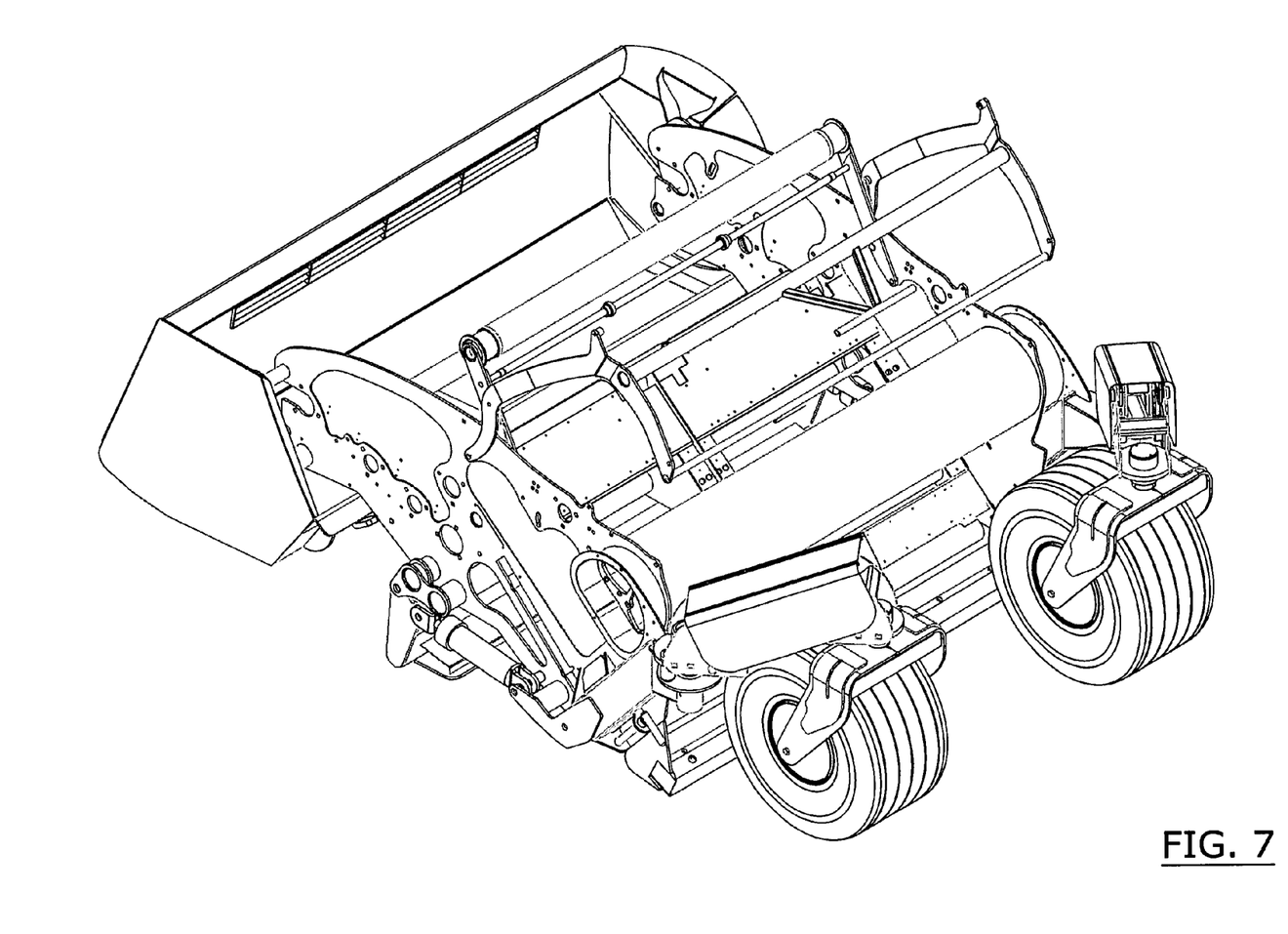
FIG. 7 is an upper perspective view of the present invention with the arms lifted.

A pair of link members 62 are connected between the front arms 70 and the rear arms 60 respectively as illustrated in FIGS. 1 through 5 of the drawings. When the front arms 70 are lifted (either manually, in combination with an actuator 74, or solely via an actuator 74), the rear arms 60 are also lifted causing the front roller 52 and the rear roller 50 to lift upwardly as best illustrated in FIGS. 4 and 5 of the drawings.

The link members 62 each are preferably pivotally attached to the rear arms 60 respectively. The link members 62 each preferably include a slot for slidably receiving a pin extending from each of the front arms 70 respectively as further shown in FIGS. 2 through 5 of the drawings. It can be appreciated that the slot and pin combination may be utilized with respect to the portion of the link members 62 connected to the rear arms 60 with the pivotal connection at the front arms 70.

F. Operation of Invention

In use, the sweeper chain 40 and the digger chain 30 are operated to clean the ground surface of debris 12 contained within. The upper run of the digger chain 30 and the lower run of the sweeper chain 40 move in the same direction adjacent to one another as best illustrated in FIGS. 2 and 3 of the drawings. As the debris 12 is lifted by the digger chain 30, the sweeper chain 40 compresses the debris 12 between the chains 30, 40 with the sweeper chain 40 forming to the shape of the debris 12 as shown in FIG. 2. For larger debris 12 that is positioned between the chains 30, 40, the rear arms 60 pivot upwardly to allow the debris 12 to exit into a bucket 14 without becoming stuck and within squeezing the debris 12 between opposing rollers. As the rear arms 60 pivot, the pins slide within the slots 64 of the link members 62 as shown in FIG. 3 of the drawings.

If a piece of debris 12 becomes non-movably lodged between the chains 30, 40, the user lifts upon the handle 72 to lift the front arms 70 as shown in FIGS. 4 and 5 of the drawings. As the front arms 70 are lifted, the actuators 74 assist in the lifting of the front arms 70. As the front arms 70 are lifted, the rear arms 60 are also lifted by the link members 62. The lifting of the front arms 70 and the rear arms 60 causes lifting of the front roller 52 and rear roller 50 respectively thereby lifting the sweeper chain 40 as shown in FIGS. 4 and 5 of the drawings. With the sweeper chain 40 lifted from the digger chain 30, the user is able to easily remove the debris 12 from between the chains 30, 40. After the debris 12 is removed, the user is able to lower the arms 60, 70 thereby allowing for continued operation of the cleaning machine 20.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A sweeper chain support system, comprising:
   a cleaning machine for cleaning a ground surface, said cleaning machine including a digger chain and a sweeper chain;
   a rear roller supporting a rear portion of said sweeper chain;
   a pair of rear arms pivotally attached at a first pivot point to said cleaning machine, wherein said rear arms are attached to said rear roller,
   a front roller supporting a front portion of said sweeper chain;
   a pair of front arms pivotally attached at a second pivot point to said cleaning machine, wherein said first pivot point is positioned forwardly with respect to said second pivot point and
   a pair of link members connected between the front arms and the rear arms respectively, wherein when said front arms are lifted said rear arms are also lifted causing said rear roller to lift upwardly.

2. The sweeper chain support system of claim 1, wherein said link members each are pivotally attached to said rear arms respectively and wherein said link members each include a slot for slidably receiving a pin extending from each of said front arms respectively.

3. The sweeper chain support system of claim 1, including a handle attached between said front arms.

4. The sweeper chain support system of claim 1, including at least one actuator connected between said cleaning machine and said front arms for providing an upward lifting force when said front arms are lifted.

5. The sweeper chain support system of claim 1, wherein said front arms are attached to said front roller, wherein when said front arms are lifted upwardly said front roller is lifted upwardly.

6. The sweeper chain support system of claim 2, including a bias member attached between said cleaning machine and said rear arms for applying a downward bias force upon said rear arms.

7. The sweeper chain support system of claim 4, wherein said at least one actuator is substantially aligned with said front arms when said front arms are lowered thereby providing an insignificant amount of lifting force to said front arms and wherein said at least one actuator is at an angle with respect to said front arms when said front arms are at least partially lifted for assisting in lifting said front arms.

8. The sweeper chain support system of claim 4, wherein said at least one actuator is comprised of a pressurized gas actuator.

9. A sweeper chain support system comprising:
   a cleaning machine for cleaning a ground surface, said cleaning machine including a sweeper chain;
   a rear roller supporting a rear portion of said sweeper chain;
   a pair of rear arms pivotally attached at a first pivot point to said cleaning machine, wherein said rear arms are attached to said rear roller;
   a front roller supporting a front portion of said sweeper chain;
   a pair of front arms pivotally attached at a second pivot point to said cleaning machine, wherein said first pivot point is positioned forwardly with respect to said second pivot point; and
   a pair of link members connected between the front arms and the rear arms respectively, wherein when said front arms are lifted said rear arms are also lifted causing said rear roller to lift upwardly.

10. The sweeper chain support system of claim 9, wherein said link members each are pivotally attached to said rear arms respectively and wherein said link members each include a slot for slidably receiving a pin extending from each of said front arms respectively.

11. The sweeper chain support system of claim 9, including at least one actuator connected between said cleaning machine and said front arms for providing an upward lifting force when said front arms are lifted.

12. The sweeper chain support system of claim 9, wherein said front arms are attached to said front roller, wherein when said front arms are lifted upwardly said front roller is lifted upwardly.

13. The sweeper chain support system of claim 10, including a bias member attached between said cleaning machine and said rear arms for applying a downward bias force upon said rear arms.

14. The sweeper chain support system of claim 11, wherein said at least one actuator is substantially aligned with said front arms when said front arms are lowered thereby providing an insignificant amount of lifting force to said front arms and wherein said at least one actuator is at an angle with respect to said front arms when said front arms are at least partially lifted for assisting in lifting said front arms.

15. The sweeper chain support system of claim 11, wherein said at least one actuator is comprised of a pressurized gas actuator.

16. A sweeper chain support system, comprising:
   a cleaning machine for cleaning a ground surface, said cleaning machine including a sweeper chain;
   a rear roller supporting a rear portion of said sweeper chain;
   a pair of rear arms pivotally attached at a first pivot point to said cleaning machine, wherein said rear arms are attached to said rear roller;
   a front roller supporting a front portion of said sweeper chain;
   a pair of front arms pivotally attached at a second pivot point to said cleaning machine, wherein said front arms are attached to said front roller; and
   a pair of link members connected between the front arms and the rear arms respectively, wherein when said front arms are lifted said rear arms are also lifted causing said front roller and said rear roller to lift upwardly;
   wherein said link members each are pivotally attached to said rear arms respectively and wherein said link members each include a slot for slidably receiving a pin extending from each of said front arms respectively.

17. The sweeper chain support system of claim 16, including a bias member attached between said cleaning machine and said rear arms for applying a downward bias force upon said rear arms.

18. The sweeper chain support system of claim 16, including at least one actuator connected between said cleaning machine and said front arms for providing an upward lifting force when said front arms are lifted.

19. The sweeper chain support system of claim 16, wherein said first pivot point is positioned forwardly with respect to said second pivot point.

20. The sweeper chain support system of claim 18, wherein said at least one actuator is substantially aligned with said front arms when said front arms are lowered thereby providing an insignificant amount of lifting force to said front arms and wherein said at least one actuator is at an angle with respect to said front arms when said front arms are at least partially lifted for assisting in lifting said front arms.

* * * * *